United States Patent [19]

Ko et al.

[11] Patent Number: 5,399,654
[45] Date of Patent: Mar. 21, 1995

[54] METHOD FOR THE PRODUCTION OF PHOSPHORUS-CONTAINING AROMATIC POLYESTER

[75] Inventors: Young H. Ko; Seung D. Cho; Byung C. Jeon, all of Jeonlanam-Do, Rep. of Korea

[73] Assignee: Korea Kumho Petrochemical Co., Ltd., Rep. of Korea

[21] Appl. No.: 139,000

[22] Filed: Oct. 21, 1993

[30] Foreign Application Priority Data

Jul. 6, 1993 [KR] Rep. of Korea ............... 1993-12634

[51] Int. Cl.$^6$ ............................................. C08G 63/79
[52] U.S. Cl. ........................................ 528/99; 528/88; 528/104; 528/112; 528/167; 528/169; 528/287; 528/398
[58] Field of Search ............... 528/167, 169, 287, 398, 528/88, 99, 104, 112

[56] References Cited

U.S. PATENT DOCUMENTS 4,463,159 7/1984 Besecke et al. ..................... 528/167

Primary Examiner—Samuel A. Acquah
Attorney, Agent, or Firm—Harrison & Egbert

[57] ABSTRACT

A phosphorus-containing wholly aromatic polyester is produced by an interfacial polymerization method which includes the step of reacting a phosphorus-containing bisphenol compound and a bisphenol compound with dicarboxylic acid chlorides. An organic layer containing the dicarboxylic acid chlorides and phase transfer catalyst is added into an alkaline aqueous layer which contains a bisphenol compound.

4 Claims, 1 Drawing Sheet

FIG. 1A
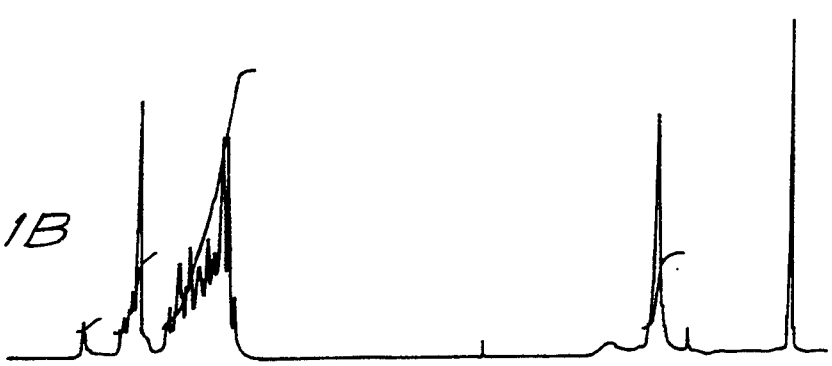
FIG. 1B
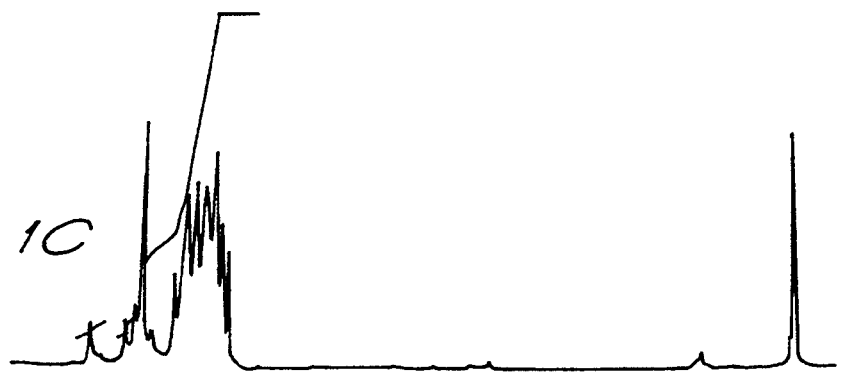
FIG. 1C
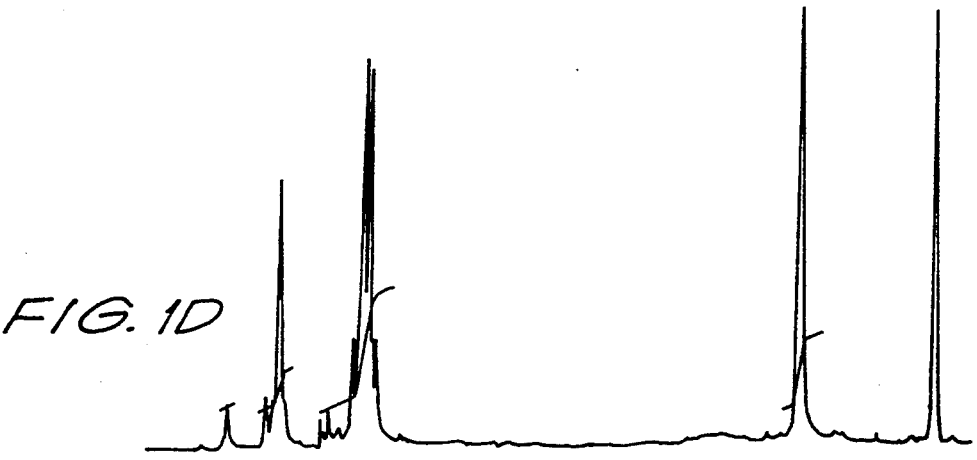
FIG. 1D
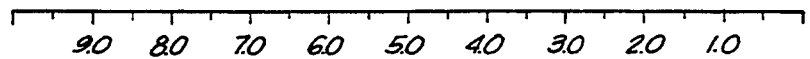

METHOD FOR THE PRODUCTION OF PHOSPHORUS-CONTAINING AROMATIC POLYESTER

BACKGROUND OF THE INVENTION

1. Field of the Invention

The present invention relates to a method for polymerizing phosphorus-containing aromatic polyesters and more particularly to improvements in fire retardancy and chemical stability of a wholly aromatic polyester containing phosphorous compounds along with a method for polymerizing the same.

2. Description of the Prior Art

Generally, phosphorous compounds have been introduced into a main chain of an aromatic polyester by a skill known well to the art such as a solution polymerization method according to R. L. Holzberlein et al., in Polymer prepr., 30(1), 293(1989) which comprises heating a bisphenol and an aromatic dicarboxylic acid chloride in an organic solvent and a melt polymerization method which comprises heating a phenyl ester of an aromatic dicarboxylic acid and a bisphenol. However, when an aromatic polyester is produced by the solution polymerization method or the melt polymerization method, a high temperature or a reduced pressure is required. In addition, the aromatic polyesters produced by the aforementioned methods often show low molecular weights and are frequently discolored. Furthermore, the aromatic polyester according to both the conventional methods has not a sufficient fire retardancy and a satisfactory chemical resistance.

SUMMARY OF THE INVENTION

For solving the aforementioned problems, the present inventors have recognized that there exist a need for an aromatic polyester that has improvements in fire retardancy, in chemical stability, and in molecular weight and for a method for polymerizing the aromatic polyester.

Accordingly, in an aspect of the present invention, there is provided the method for the production of a phorphorus-containing wholly aromatic polyester which has an excellent flame-retardant property.

According to another aspect of the present invention, there is provided the method for the production of a phosphorus-containing wholly aromatic polyester which has a satisfactory chemical stability.

According to a further aspect of the present invention, there is provided the method for the production of a phosphorus-containing wholly aromatic polyester which has a sufficient molecular weight.

According to still a further aspect of the present invention, there is provided a method for the polymerization of the wholly aromatic polyester.

The interfacial polymerization method for the phosphorous-containing wholly aromatic polyester according to the present invention comprises a repeating unit of the following general formula (I) produced by reacting a bisphenol compound unit with an aromatic dicarboxylic acid chloride, with the aid of a phase-transfer catalyst, including the step of adding the phase-transfer catalyst to an organic layer, and then adding the resulting organic layer to an aqueous layer:

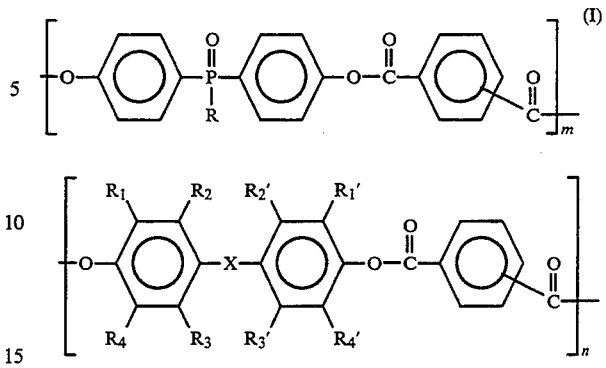

wherein m and n are integers, both being in the relation of $0 \leq n/(m+n) < 1$ and $0 < m/(m+n) \leq 1$;

R is selected from a group consisting of lower alkyl or aryl;

X is selected from a group consisting of —O—, —S—, —SO$_2$—, —SO—, —CO—, an akylene group containing 1 to 4 carbon atoms, and an alkylidene group containing 1 to 4 carbon atoms; and $R_1$, $R_2$, $R_3$, $R_4$, $R_1'$, $R_2'$, $R_3'$, and $R_4'$ which are independent, each is selected from a group consisting of a hydrogen atom, and lower alkyl.

In accordance with the present invention, the phosphorous-containing wholly aromatic polyester is produced by a method which comprises the step of introducing phosphorous-containing compound, and introducing the phosphorous-containing bisphenol-type compound into a main chain of the polyester. The step of introducing further comprises the steps of adding the phosphorous-containing compound in combination with an bisphenol into an equimolar alkaline aqueous solution and then adding the water-immiscible organic solution of aromatic dicarboxylic chloride containing a phase-transfer catalyst into the resulting aqueous solution.

These and other objects and advantages of the present invention will become more apparent as the following description proceeds.

BRIEF DESCRIPTION OF THE DRAWINGS

FIG. 1A is a NMR spectrum of the wholly aromatic polyester in which a mole ratio of BPA to BHPPO is 0.9:0.1, using a $^1$H-NMR spectrometer;

FIG. 1B is a NMR spectrum of the wholly aromatic polyester in which a mole ratio of BPA to BHPPO is 0.5:0.5, using a $^1$H-NMR spectrometer;

FIG. 1C is a NMR spectrum of the wholly aromatic polyester in which a mole ratio of BPA to BHPPO is 0:1.0, using a $^1$H-NMR spectrometer; and FIG. 1D is a NMR spectrum of the wholly aromatic polyester in which a mole ratio of BPA to BHPPO is 1.0:0, using a $^1$H-NMR spectrometer.

DETAILED DESCRIPTION OF THE INVENTION

A phosphorous-containing functional group may be introduced into the main chain of an aromatic polyester by reacting it into a constituent for the polyester and polymerizing it. According to the present invention, a phosphorous-containing functional group is changed into a bisphenol compound, which may be a member forming the main chain of an aromatic polyester, to produce a wholly aromatic polyester having an excellent fire retardancy and a satisfactory chemical resistance. The wholly aromatic polyester according to the present invention has a repeating unit of the following general formula I produced by reacting a bisphenol compound unit with an aromatic dicarboxylic acid chloride with the aid of a phase-transfer catalyst:

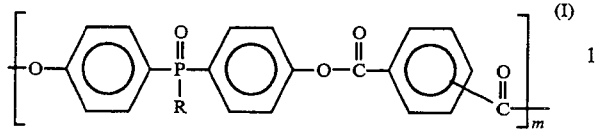

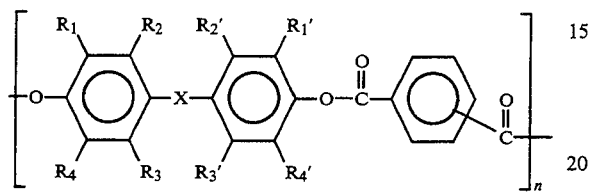

wherein m and n are integers, both being in the relation of $0 \leq n/(m+n) < 1$ and $0 < m/(m+n) \leq 1$;

R is selected from a group consisting of lower alkyl or aryl;

X is selected from a group consisting of an akylene group containing 1 to 4 carbon atoms, and an alkylidene group containing 1 to 4 carbon atoms; and $R_1$, $R_2$, $R_3$, $R_4$, $R_1'$, $R_2'$, $R_3'$, and $R_4'$, which are independent, each is selected from a group consisting of a hydrogen atom, and lower alkyl group containing 1 to 2 carbon atoms.

The phosphorous-containing bisphenol compound used in the present invention has the following general formula II:

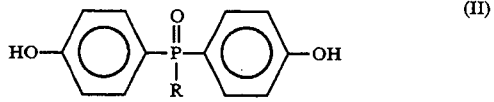

wherein R is selected from a group consisting of lower alkyl or aryl. The dicarboxylic acid chlorides used in the present invention are terephthalic acid chloride and isophthalic acid chloride.

In an embodiment of the present invention, the phosphorus-containing bisphenol compound is synthesized a method according to J. C. Abed et al., in Polymer prep., (2), 233(1992) as shown in the following schematic reaction flow A:

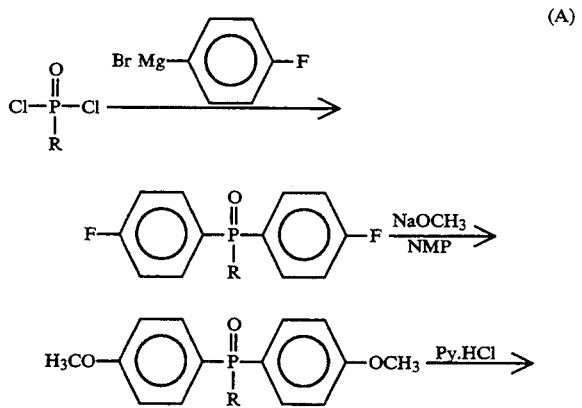

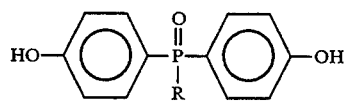

wherein R is selected from a group consisting of lower alkyl or aryl.

Besides the phosphorous-containing bisphenol compound, as an alcoholic compound constituting the wholly aromatic compound according to the present invention, there may be used such bisphenol compounds as follow general formula III:

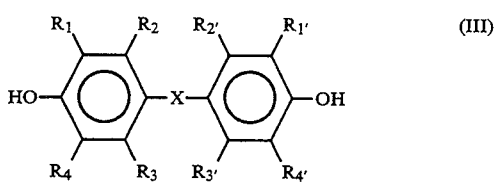

wherein X is selected from a group consisting of an akylene group containing 1 to 4 carbon atoms, or an alkylidene group containing 1 to 4 carbon atoms; and $R_1$, $R_2$, $R_3$, $R_4$, $R_1'$, $R_2'$, $R_3'$, and $R_4'$, which are independent, each is selected from a group consisting of a hydrogen atom, and lower alkyl.

In accordance with the present invention, the wholly aromatic polyester is produced by an interfacial polymerization method which comprises mixing the phosphorous-containing bisphenol compound and the bisphenols of the above general formula III in a ratio of 0.05:0.95 to 1.0:0, dissolving the mixture in an alkaline aqueous solution and adding an aromatic dicarboxylic acid dissolved in a methylene chloride solvent containing a phase-transfer catalyst into the resulting aqueous solution. In producing the phosphorous-containing wholly aromatic polyester, each of the alkaline aqueous solution and the methylene chloride solution has preferably about 5 to about 20% by weight of the monomer. In the present invention, it is preferred to control equivalents of the reactants and to let the molar ratio of bisphenol, terephthalic acid chloride and isophthalic acid chloride be ranged from 1:0.9:0.1 to 1:0.1:0.9. In the water-immiscible organic solvent, the concentration of the phase-transfer catalyst is preferably on the order of about 0.05 to about 1.0% by mole based on the mole number of bisphenol used. A suitable phase-transfer catalyst is tetrabutyl ammonium bromide.

To evaluate the fire retardancy and the thermal stability of the phosphorous-containing wholly aromatic polyester according to the present invention, a glass transition temperature (Tg), a decomposition-Starting temperature (Ts), a maximal decomposition temperature (Truax), and a residue of the polymer on treating it at 700° C. ($R_{700°\ C.}$) are measured under a nitrogen atmosphere and an air, using a differential scanning calorimeter (hereinafter "DSC") and a thermal gravimetric analyzer (hereinafter "TGA"). In both cases, the temperature of the atmosphere is raised in a rate of 10° C./min.

In the meantime, an additional test for the fire retardancy of the phosphorous-containing wholly aromatic polyester is performed as described in Japanese Pat. No. Heisei 4-493 and U.S. Pat. No. 4,171,330. The test piece is made by using injection molding machine, which has a length of 5 inches, a width of 0.5 inch and a thickness of 1/16 inch. These test piece was subjected to burning testing in accordance with Underwriters Laboratories Subject 94.

In order to ascertain good physical properties for the phosphorous-containing wholly aromatic polyesters according to the present invention, there is evaluated an inherent viscosity thereof which is defined by the following equation:

$$D_{inh} = \frac{\ln t_1/t_2}{C}$$

wherein $t_1$ is the falling time (in seconds) of a solution of the polyester in a capillary tube of viscometer; $t_2$ is the falling time (in seconds) of the solvent; and C is the concentration (in g/dl) of the polyester in the solution. The inherent viscosity, as used herein, is determined in a mixture of phenol and 1,1,2,2-tetrachloroethane (weight ratio; 6:4) at 25° C. with the concentration of the polyester being 1 g/dl.

From the results of analysis with a DSC and a TGA, DSC curves for the phosphorous-containing wholly aromatic polyester have not a crystallization or melt peak. In addition, depending on increasing the mole ratio of bis(4-hydroxyphenyl)phenyl phosphine oxide (hereinafter called as "BHPPO"), which is a bisphenol monomer produced by the method according to the present invention, Tg increases, as well. Furthermore, when analyzing the phosphorous-containing wholly aromatic polyester according to the invention with the TGA under a nitrogen atmosphere, Ts and Truax are irrelevant to the BHPPO content but $R_{700° C.}$ increases as the BHPPO content increases. Especially, from the results of a TGA analysis in air, it is known that $R_{700° C.}$ is increased markedly according to BHPPO content, whereas the conventional aromatic polyester remains nothing at 700° C. Therefore, in accordance with the present invention, the introduction of BHPPO, a phosphorous-containing bisphenol compound, into a main chain of wholly aromatic polyester could bring about a remarkable improvement in the fire retardancy thereof.

The following examples and comparative example are merely intended to illustrate the present invention in further detail and should not by no means be considered to be limitative of the scope of the invention.

Synthesis of BHPPO

A mixture of anhydrous ethylether and dried magnesium 5 g was put in a reaction vessel, into which a solution of parabromofluorobezene 35 g dissolved in anhydrous ethylether 50 ml subsequently was added slowly to prepare a Grignard reagent. Into this Grignard reagent, a solution of dichlorophenylphosphine oxide 19.5 g dissolved in anhydrous ethylether was added for a reaction. After performing the reaction, the solution was washed with distilled water and moisture was removed therefrom with a drying agent. Thereafter, the resulting solution was concentrated under a reduced pressure and was vacuum-distilled to give 25.77 g of bis(4-fluorophenyl)phenylphosphine oxide, which was then subjected to the treatment of infrared spectrum analysis and NMR spectrum analysis to insure the existence of P=O and —P—$C_6H_4$— groups therein.

The bis(4-fluorophenyl )phenylphosphine oxide was dissolved in N-methyl-2-pyrrolidone (hereinafter "NMP") to prepare a reactive solution, into which 11 g of sodium methoxide was added to react therewith for 3.5 hours at 90° C. A hydrolyzed solution resulted from the reaction was extracted with ethylacetate. The extracted liquid was washed with distilled water in many times, dried over magnesium sulfate and concentrated at a reduced atmosphere. To this, 20 g of pyridine hydrochloride was added, and subjected to the treatment of reflux for 2 hours at 200° C. After the reflux, the resultant was dissolved in methanol and reprecipitated into water. The white solid bisphenol product was filtered and dried to give 12.1 g of a product. The product was treated to the analysis of a NMR spectroscopy and an infrared spectroscopy in order to ascertain BHPPO.

EXAMPLE 1

26.6 g of bisphenol-A (hereinafter "BPA"), 4 g of BHPPO (10% by mole to BPA) and 10.3 g of sodium hydroxide were dissolved in 210 ml of distilled water to prepare a reactive solution. Separately, each 13.8 g of terephthalic acid chloride and isophthalic acid chloride (1:1 mole ratio) were dissolved in 175 ml of methylene chloride in combination with 0.06 g of tetrabutyl ammonium bromide (hereinafter "TBAB") as a phase-transfer catalyst. The two solutions were placed in a reaction vessel and were stirred vigorously for 1.0 hour with keeping a reaction temperature at 30° C. The stirring was then stopped, and the aqueous solution layer was removed from the reaction vessel. The remained methylene chloride layer was subjected to the treatment of removing un-reactants and by-products with an alkaline and an acidic aqueous solutions. Thereafter, the organic layer was washed with distilled water in several times, diluted into about 10% by weight and treated to precipitation in methanol. The precipitate was dried for at least 24 hours at 100° C. to obtain a polymer.

The polymer was analyzed with a $^1$H-NMR spectroscope to be ascertained as a phosphorous-containing wholly aromatic polyester. The analysis result is shown in FIG. 1A in which peak characteristics in an aromatic compound containing ester bonds therein are illustrated well.

In the meanwhile, the inherent viscosity of the polymer was measured and the result ($\eta_{inh}$) is given as shown in Table 1 together with the yield therefor.

EXAMPLE 2

A polymerization was carried out in a manner similar to Example 1 except that BHPPO and BPA were added in a mole ratio of 0.5:0,5 and subjected to -the treatment of reaction. 46.2 g of phosphorous-containing wholly aromatic polyester was yielded. The result of NMR spectroscopy analysis is shown in FIG. 1B. The inherent viscosity of the polymer was measured and the result ($\eta_{inh}$) is given as shown in Table 1 together with the yield therefor.

EXAMPLE 3

A polymerization was carried out in a manner similar to Example 1 except that BHPPO and BPA were added in a mole ratio of 1.0:0 and subjected to the treatment of reaction. 46.4 g of phosphorous-containing wholly aromatic polyester was yielded. The result of NMR spectroscopy analysis is shown in FIG. 1C. The inherent viscosity of the polymer was measured and the result ($\eta_{inh}$) is given as shown in Table 1 together with the yield therefor.

COMPARATIVE EXAMPLE 1

A polymerization was carried out in a manner similar to Example 1 except that only BPA was used without BHPPO and subjected to the treatment of reaction. 46.1 g of wholly aromatic polyester was yielded. The result of NMR spectroscopy analysis is shown in FIG. 1D, The inherent viscosity of the polymer was measured and the result ($\eta_{inh}$) is given as shown in Table 1 together with the yield therefor.

TABLE 1

| Example No. | Bisphenols* BHPPO | Bisphenols* BPA | Inherent Viscosity ($\eta_{inh}$ dl/g) | Yield (%) |
| --- | --- | --- | --- | --- |
| 1 | 0.1 | 0.9 | 0.46 | 97.7 |
| 2 | 0.5 | 0.5 | 0.33 | 97.5 |
| 3 | 1.0 | 0 | 0.22 | 98.0 |
| C. 1 | 0 | 1.0 | 0.56 | 97.1 |

*mole ratio

EVALUATION TEST 1

Each of the glass transition temperatures (Tg) of the wholly aromatic polyesters produced in Examples 1 to 3 and Comparative Example 1 was measured under a nitrogen atmosphere in which the temperature was raised in a rate of 10° C./min, using a DSC.

Their results are given as shown in Table 2.

EVALUATION TEST 2

Each of the decomposition temperatures such as Ts and Tmax and the $R_{700° C.}$ of the wholly aromatic polyesters produced in Examples 1 to 3 and Comparative Example 1 was measured under a nitrogen atmosphere in which the temperature was raised in a rate of 10° C./min, using a DSC. The same procedures as these were repeated under art air atmosphere.

Their results are given as shown in Table 2.

EVALUATION TEST 3

Each of the produced polyesters was molded using an injection molding machine with the cylinder temperature at 340° C. and the pressure at 1,200 kg/cm² to form test pieces which are 5 inches long, 0.5 inch wide and 1/16 inch thick. The test pieces were subjected to burning-testing in accordance with Underwriters Laboratories Subject 94 to measure their burning times. The results obtained are shown in Table 2 below.

TABLE 2

| Exam. No. | E. Test 1 DSC Tg (°C.) | E. Test 2 TGA N2 Ts (°C.) | E. Test 2 TGA N2 Tmax (°C.) | E. Test 2 TGA N2 $R_{700° C.}$ (%) | E. Test 2 TGA Air Ts (°C.) | E. Test 2 TGA Air Tmax (°C.) | E. Test 2 TGA Air $R_{700° C.}$ (%) | E. Test 3 Avg. Burning Time (sec) | E. Test 3 UL-94 Rank |
| --- | --- | --- | --- | --- | --- | --- | --- | --- | --- |
| 1 | 192.4 | 459.7 | 478.2 | 30.6 | 458.8 | 483.3 | 5.07 | 6 | V-0 |
| 2 | 206.9 | 436.8 | 458.9 | 36.3 | 443.0 | 484.6 | 26.23 | 1 | V-0 |
| 3 | 215.8 | 453.7 | 482.1 | 47.4 | 462.7 | 484.6 | 36.42 | 0 | V-0 |
| C. 1 | 190.2 | 469.0 | 487.2 | 21.3 | 473.7 | 496.4 | 0 | 10 | V-1 |

From the results of Examples and Comparative Example, it is apparent that the phosphorus-containing wholly aromatic polyester according to the present invention is obtained in a high yield. In addition, the polymer has many superior properties, especially thermal stability and fire retardancy. As indicated in the Table 2, while a film of a wholly aromatic polyester without BHPPO is fired for a long time since a fire source has been removed therefrom, a film of the phosphorous-containing wholly aromatic polyester has a shorter burning time. Furthermore, the more BHPPO is contained in the polymer, the shorter is the burning time.

What is claimed is:

1. An interfacial polymerization method for forming a phosphorus-containing wholly aromatic polyester having a repeated unit of the following general formula (I)

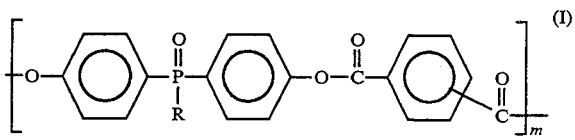

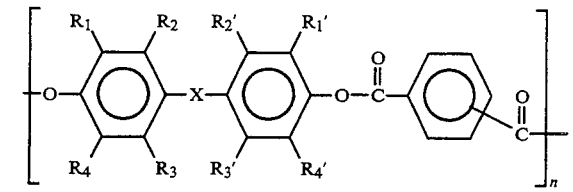

wherein m and n are integers, both being in the relation of $0 \leq n/(m+n) < 1$ and $0 < m/(m+n) \leq 1$, R being selected from the group consisting of an alkyl group containing 1 to 2 carbon atoms and an aryl group containing 6 to 12 carbon atoms, X being selected from the group consisting of an alkylene group containing 1 to 4 carbon atoms and an alkylidene group containing 1 to 4 carbon atoms, and $R_1$, $R_2$, $R_3$, $R_4$, $R_1'$, $R_2'$, $R_3'$, $R_4'$ which are independent and each comprises a hydrogen atom and an alkyl group containing 1 to 2 carbon atoms, the method comprising the steps of:

providing an aqueous phase containing demineralized water and an alkali salt selected from the group consisting of a bisphenol and a phosphorus-containing bisphenol;

providing an organic phase containing an organic solvent, a phthaloyl chloride, and a catalytic amount of a phase-transfer catalyst; and adding said organic phase to said aqueous phase.

2. The method of claim 1, wherein said bisphenol is a bisphenol compound containing bisphenol A and bis(p-hydroxyphenyl)phenyl phosphine oxide which is greater than 5% by mole.

3. The method of claim 1, wherein said phthaloyl chloride is a mixture of terephthaloyl chloride and isophthaloyl chloride with a mole ratio thereof being in a range of 9:1 and 1:9.

4. The method of claim 1, wherein said phase-transfer catalyst is tetrabutyl ammonium bromide and is added in an amount of 0.01 to 1.0% by mole.

* * * * *